US005653901A

United States Patent [19]

Yoshimura

[11] Patent Number: 5,653,901

[45] Date of Patent: Aug. 5, 1997

[54] METHOD OF FABRICATING A NOZZLE PLATE

[75] Inventor: Manabu Yoshimura, Nagoya, Japan

[73] Assignee: Brother Kogyo Kabushiki Kaisha, Nagoya, Japan

[21] Appl. No.: 650,348

[22] Filed: May 20, 1996

Related U.S. Application Data

[63] Continuation of Ser. No. 242,444, May 13, 1994, abandoned.

[30] Foreign Application Priority Data

| | | | |
|---|---|---|---|
| Aug. 18, 1993 | [JP] | Japan | 5-203878 |
| Jan. 31, 1994 | [JP] | Japan | 6-009777 |

[51] Int. Cl.[6] ................ B23K 26/00; B41J 2/16

[52] U.S. Cl. ................ 219/121.71; 29/890.1; 347/45; 347/47

[58] Field of Search ................ 219/121.7, 121.71, 219/121.72, 121.85; 347/45, 47; 29/890.1; 264/400; 427/555, 596, 375

[56] References Cited

U.S. PATENT DOCUMENTS

| | | | |
|---|---|---|---|
| 5,194,713 | 3/1993 | Egitto et al. | 219/121.71 |
| 5,208,604 | 5/1993 | Watanabe et al. . | |
| 5,365,255 | 11/1994 | Inoue et al. | 347/45 |

FOREIGN PATENT DOCUMENTS

| | | |
|---|---|---|
| 0 359 365 | 3/1990 | European Pat. Off. . |
| 55-65564 | 5/1980 | Japan . |
| 4-279356 | 10/1992 | Japan . |
| 5-69550 | 3/1993 | Japan . |

OTHER PUBLICATIONS

R. Srinivasan et al., "Ultraviolet Laser Ablation of Organic Polymers", Chemical Review, 1989, vol. 89, No. 6, pp. 1303–1316.

*Primary Examiner*—Philip H. Leung
*Assistant Examiner*—Gregory L. Mills
*Attorney, Agent, or Firm*—Oliff & Berridge

[57] ABSTRACT

A nozzle plate for an ink-jet printer includes a base plate and a water-repellent film formed over one major surface of the base plate. The water-repellent film is subjected to heat treatment for a given processing time at a processing temperature higher than the softening point of the material forming the water-repellent film after forming a nozzle hole through the base plate and the water-repellent film by a nozzle hole forming process. The heat treatment softens and substantially flattens burrs in the water-repellent film formed in the nozzle hole forming process.

17 Claims, 4 Drawing Sheets

METHOD OF FABRICATING A NOZZLE PLATE

This is a continuation of application Ser. No. 08/242,444 filed May 13, 1994, now abandoned.

BACKGROUND OF THE INVENTION

1. Field of the Invention

The present invention relates to a method of fabricating a nozzle plate comprising a base plate provided with a nozzle hole and a water-repellent film formed on one surface of the nozzle plate.

2. Description of Related Art

Known ink jet printers have a print head with a nozzle plate provided with a nozzle hole. However, in operation, ink droplets are unable to travel in the correct direction or be ejected at all if part of the surface of the nozzle plate around the nozzle hole is wet with the ink. To overcome these problems, an invention disclosed in European Patent No. 359365 provides a nozzle plate comprising a plate provided with a nozzle hole and a water-repellent film formed on one surface of the plate to prevent wetting the surface of the plate with the ink.

When the water-repellent film is formed on the major surface of the plate after forming a nozzle hole in the plate, part of the circumference of the nozzle hole is coated unevenly with the water-repellent film or, in the worst case, the nozzle hole is clogged with the water-repellent film. Consequently, the meniscus of the ink differs from one nozzle plate to another, which varies ink jetting time from one nozzle plate to another. In the worst case, the ink cannot be jetted.

Such a problem may be alleviated by a method that forms the water-repellent film over the major surface of the nozzle plate after perfectly plugging up the nozzle hole with a filling material. However, it is difficult to plug up the nozzle hole perfectly with a filling material. Hence, this method is not practical.

With the foregoing problems in view, U.S. Pat. No. 5,208,604 proposes a method of fabricating a nozzle plate for an ink jet printer comprising steps of forming a water-repellent film over the surface of a plate and forming a discharge hole through the plate and the water-repellent film with an excimer laser beam or the like, in which the plate and the water-repellent film are a dry film (SE-320 manufactured by Tokyo Ohka Kogyo Co., Ltd.) and a polyimide film, respectively. Processing of a polymeric workpiece with an excimer laser beam is a laser ablation processing. According to Chemical Review, vol. 89, no. 6 (1989), American Chemical Society, the mechanism of ablation has three processes as shown in FIGS. 5(A), 5(B) and 5(C). In the process shown in FIG. 5(A), a polymeric workpiece 9 absorbs an excimer laser beam 6 transmitted through a mask 5. High molecules of the polymeric workpiece 9 are disintegrated in the process shown in FIG. 5(B), and the molecules are decomposed and atoms are scattered in the process shown in FIG. 5(C).

Generally, the water-repellent film is formed of a resin having a high water repellency, such as a fluororesin or a silicone resin. However, water-repellent films of fluororesins and silicone resins are very difficult to process with an excimer laser beam because fluororesins and silicone resins do not absorb excimer laser light having a wavelength in the ultraviolet range, such as ArF laser light of 198 nm, KrF laser light of 248 nm or XeKr laser light of 308 nm in wavelength. When a nozzle plate consisting of a plate and a water-repellent film of a fluororesin or a silicone resin formed over the surface of the base plate is exposed to an excimer laser beam, the water-repellent film is not processed by the energy of the excimer laser beam, but by the energy of the decomposed molecules and the scattered atoms of the base plate. Consequently, the water-repellent film cannot satisfactorily be processed. Specifically, burrs of the water-repellent film are formed, and the burrs cause the ejecting direction of ink droplets to vary, which deteriorates print quality.

When the nozzle hole is formed by pressing or drilling, burrs are formed even if the water-repellent film is formed of a resin other than fluororesins and silicone resins, entailing the aforesaid problems.

SUMMARY OF THE INVENTION

An object of the present invention is to provide a method of fabricating a nozzle plate provided with a water-repellent film free of burrs.

With this and other objects in view, the present invention provides a method of fabricating a nozzle plate comprising a plate provided with a nozzle hole through which the ink is jetted and a water-repellent film formed around the nozzle hole on the surface of the base plate. The steps of the method include forming a water-repellent film of a thermoplastic, water-repellent material, forming the nozzle hole through the plate and the water-repellent film, and heat-treating the water-repellent film for a given time M at a temperature higher than the softening point of the thermoplastic, water-repellent material by a given augmented temperature T. The given time M (min) and the given augmented temperature T (°C.) meet the following inequalities: $15 \leqq T \leqq 70$; $5 \leqq M \leqq 100$; and $-2M+40 \leqq T \leqq -(M/3)+80$.

Since the nozzle plate fabricating method of the present invention heat-treats the thermoplastic, water-repellent film for the given time M at the temperature higher than the softening point of the thermoplastic, water-repellent film by the given augmented temperature T after the nozzle hole has been formed, burrs of the water-repellent film formed by the process of forming the nozzle hole are melted and flattened out.

As is apparent from the foregoing explanation, the nozzle plate fabricating method according to the present invention comprises steps of forming a water-repellent film of a thermoplastic, water-repellent material over the surface of a plate, forming a nozzle hole through the plate and the water-repellent film, and heat-treating the water-repellent film for a given time at a given temperature higher than the softening point of the thermoplastic, water-repellent material by a given augmented temperature. Accordingly, burrs of the water-repellent film formed by the process of forming the nozzle hole are melted and flattened out by the heat treatment, so that the nozzle plate is free of burrs. Accordingly, the meniscus of the ink is not ruptured when jetting the ink and, consequently, an ink droplet always travels in the correct direction. Accordingly, an ink jet printer employing the nozzle plate fabricated by the nozzle plate fabricating method of this invention is capable of printing with a very satisfactory print quality. The water-repellent film can be formed of a resin having a high repellency, such as a fluororesin or a silicone resin.

BRIEF DESCRIPTION OF THE DRAWINGS

A preferred embodiment of the present invention is described in detail with reference to the accompanying drawings, wherein.

DETAILED DESCRIPTION OF PREFERRED EMBODIMENTS

A nozzle plate fabricating method in a preferred embodiment according to the present invention is described hereinafter with reference to the accompanying drawings.

Figure 1:
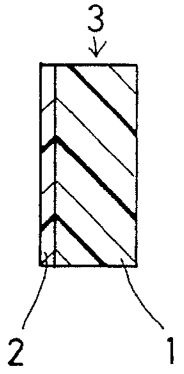
FIG. 1 is a sectional view of a nozzle plate fabricated by a nozzle plate fabricating method according to a preferred embodiment at the invention.

Referring to FIG. 1, a nozzle plate 3 comprises a base plate 1 and a water-repellent film 2 formed over one surface of the base plate 1. The base plate 1 is formed of a material resistant to the solvent contained in the ink and having a softening temperature higher than that of the material forming the water-repellent film 2. In this embodiment, the water-repellent film 2 is preferably a film of about 1 μm in thickness formed of a hexafluoropropylene tetrafluoroethylene copolymer resin (FEP resin) by a known process, and the base plate 1 is preferably formed of a polyimide resin. The softening points (melting points) of FEP resins are in the range of 250° C. to 280° C. Polyimide resins do not have melting point and have excellent thermal properties.

Suitable fluororesins for forming the water-repellent film 2 other than the FEP resin employed in this embodiment are polytetrafluoroethylene resins (PTFE resins), perfluoroalkoxyethylene tetrafluoroethylene copolymers (PFA resins), polychlorotrifluoroethylene resins (PCTFE resins), ethylene tetrafluoroethylene copolymers (ETFE resins), polyvinylidene fluoride resins and polyvinyl fluoride resins. These fluororesins are highly repellent and resistant to the solvent contained in the ink. The water-repellent film 2 may be formed of a silicone resin or the like, provided that the silicone resin is resistant to the solvent.

The base plate 1 may be formed of a thermosetting resin or a resin other than the polyimide resin, provided that the softening temperature of the resin is higher than that of the resin forming the water-repellent film 2.

The nozzle plate fabricating method uses an excimer laser beam for forming a nozzle hole. When the nozzle hole is formed by piercing or drilling, the base plate 1 may be formed of a material capable of being processed by piercing or drilling and having a softening point higher than that of the material forming the water-repellent film 2, such as a metal.

Figure 2:
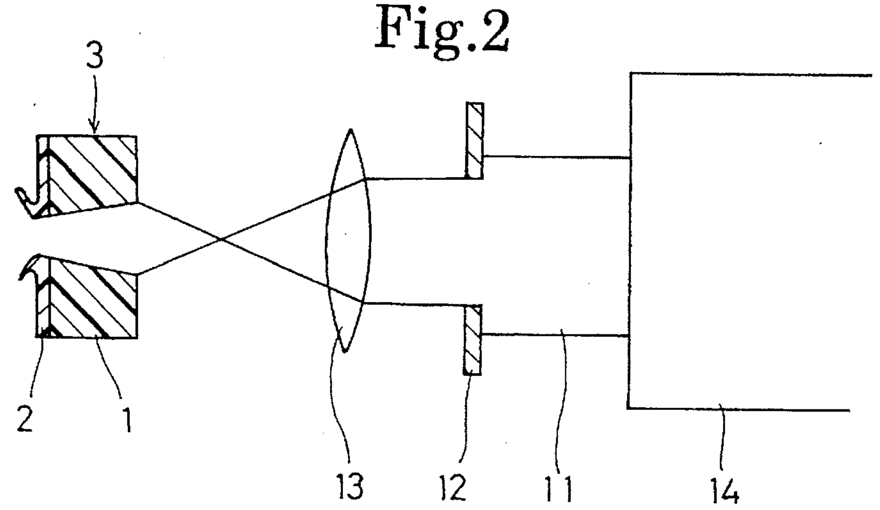
FIG. 2 is a diagrammatic schematic view in partial section of a nozzle plate processing device to explain the nozzle plate fabricating method embodying the present invention.

As shown in FIG. 2, an excimer laser beam 11 emitted by an excimer laser 14 is projected through a mask 12 having an aperture similar to a desired shape in which the nozzle hole is to be formed toward the base plate 1 of the nozzle plate 3. The excimer laser beam 11 is focused on the base plate 1 for laser machining. In this embodiment, the excimer laser is preferably a KrF excimer laser that emits an excimer laser beam of 248 nm in wavelength. The mask 12 and the lens 13 are designed properly taking into consideration the shape of the nozzle hole and laser machining conditions. In this embodiment, the lens 13 is a reducing lens having a reduction ratio of 1/5, and the diameter of the aperture formed in the mask 12 is 300 μm.

Figure 3:
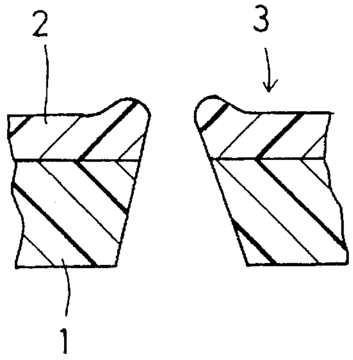
FIG. 3 is a fragmentary sectional view explaining the effect of heat treatment according to the present invention.
Figure 4:
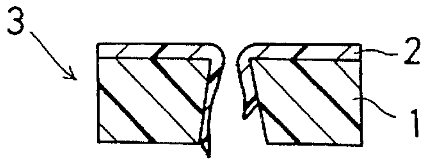
FIG. 4 is a fragmentary sectional view of a nozzle plate explaining the adverse effect of heat treatment when conditions for heat treatment deviate greatly from those of the present invention.
Figure 5A:
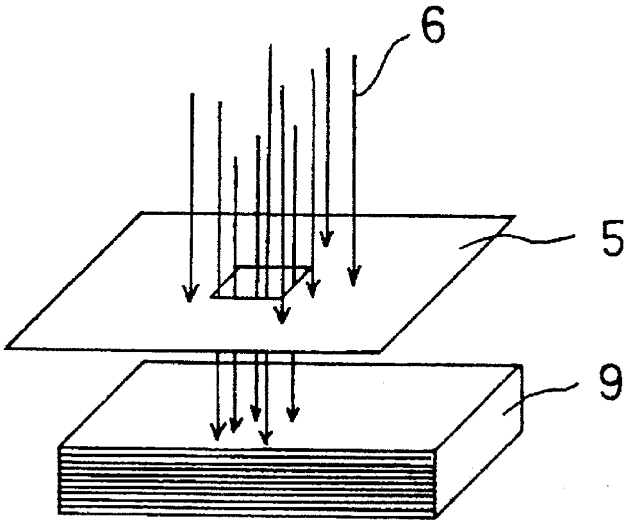
FIGS. 5(A), 5(B) and 5(C) are perspective views explaining a process of forming a nozzle hole through a polymeric film by laser ablation with an excimer laser beam.
Figure 5:
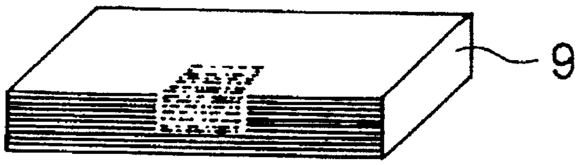
Figure 5:
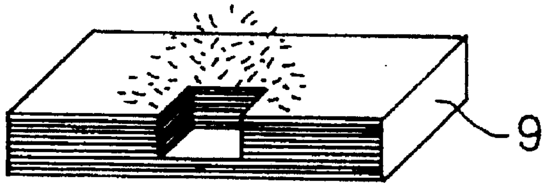

As shown in FIG. 2, burrs of the water-repellent film 2 are formed around the nozzle hole formed by laser machining. The nozzle plate 3 is kept for one hour in an oven heated at a processing temperature of 300° C., which is a suitable for the heat treatment of the burrs of the water-repellent film 2 formed of the FEP resin, to soften, partly melt and substantially flatten the burrs of the water-repellent film 2 as shown in FIG. 3. If the processing temperature is excessively high as compared with the melting point of the material forming the water-repellent film 2 or the processing time is excessively long, the water-repellent film 2 will melt and spread over the circumference of the nozzle hole and into the nozzle hole as shown in FIG. 4. Therefore, the processing temperature and the processing time must be determined properly.

Figure 6A:
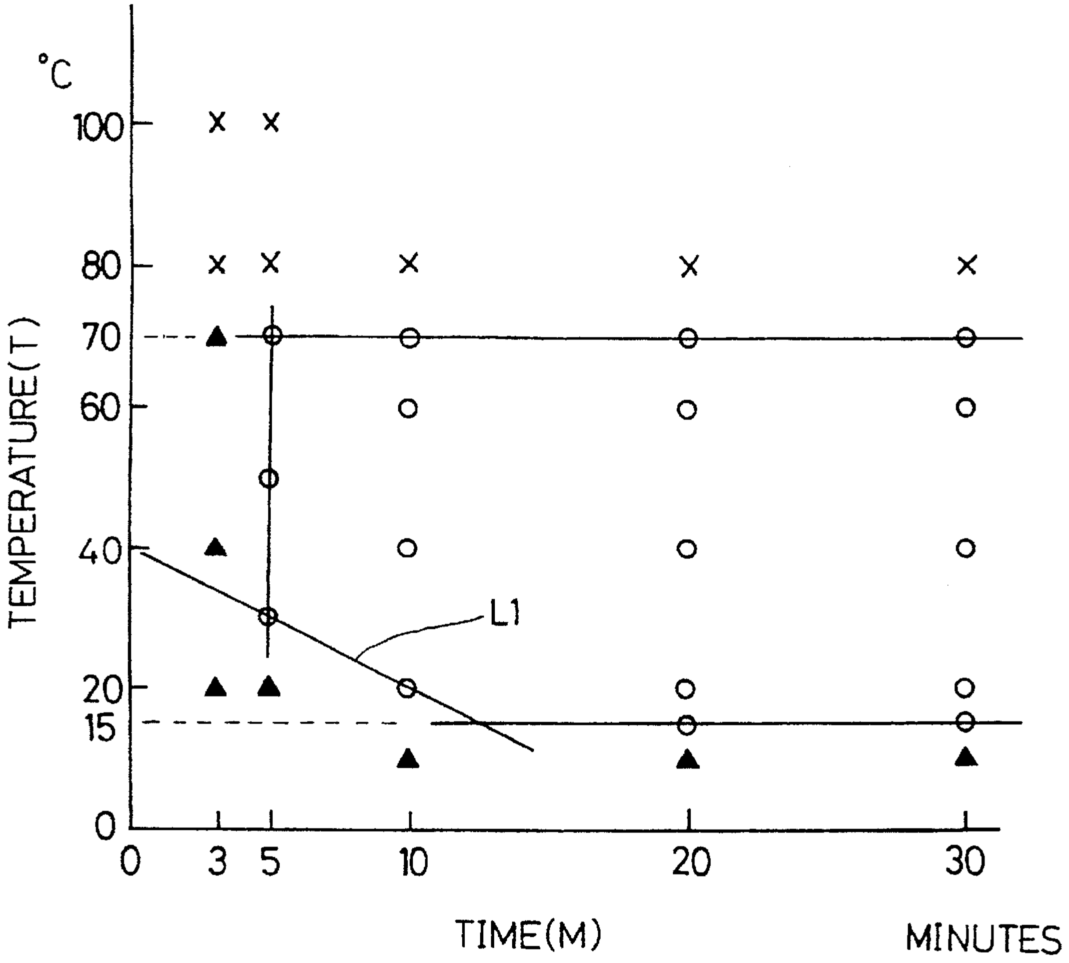
FIGS. 6(A) and 6(B) are graphs explaining the dependence of the results of heat treatment on processing temperature and processing time.
Figure 6:
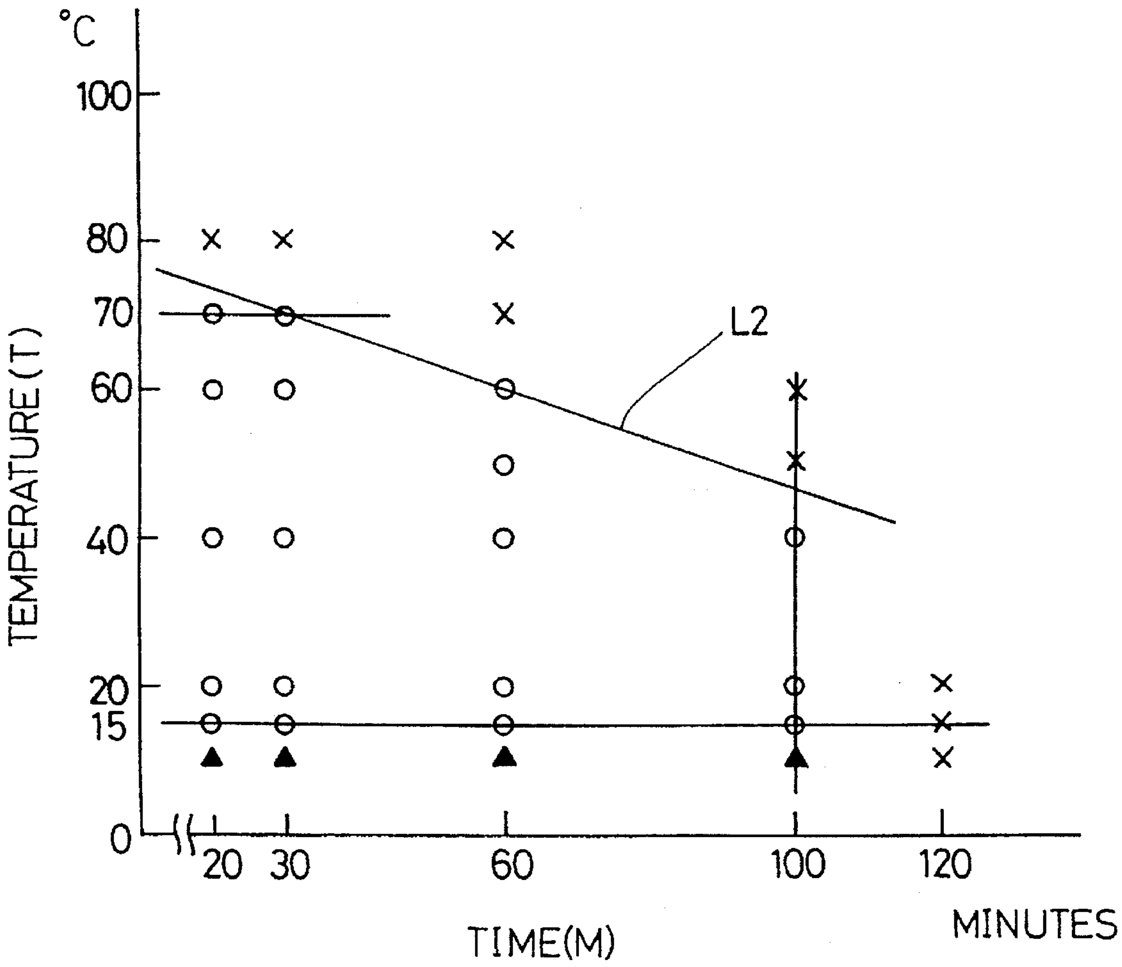

The dependence of the result of heat treatment on the processing temperature and the processing time of the heat treatment was examined experimentally to determine an optimum range of augmented temperature T and an optimum range of processing time M. FIG. 6(A) is a graph showing the results of experiments in which processing time M was varied in the range of 3 to 30 min, and FIG. 6(B) is a graph showing the results of experiments in which processing time M was varied in the range of 20 to 120 min. In FIGS. 6(A) and 6(B), the augmented temperature T, i.e., the difference between the processing temperature and the melting point of the material forming the water-repellent film 2, is measured on the vertical axes. The processing time M, i.e., the time for which the sample nozzle plate was kept in the oven heated at a processing temperature, is measured on the horizontal axes. Blank circles indicate processing conditions that softened and substantially flattened the burrs satisfactorily, solid triangles indicate processing conditions that did not soften and flatten the burrs satisfactorily, and crosses indicate processing conditions that caused the water-repellent film 2 to melt and spread over the circumference of the nozzle hole as shown in FIG. 4. The material forming the water-repellent film 2 was an FEP resin having a softening point of 280° C. The sample nozzle plates were heat-treated in an oven. The effect of the heat treatment was evaluated through the observation of the shapes of the burrs under an optical microscope.

It is evident from FIG. 6(A) that the burrs can be satisfactorily softened and flattened when the processing time M is 5 min or longer, the augmented temperature T is in the range of 15° C. to 70° C. (processing temperature is in the range of 295° C. to 350° C.), and the following inequality: $T \geqq -2M+40$ (straight line L1 in FIG. 6(A)) is satisfied. It is evident from FIG. 6(B) that the burrs can be satisfactorily softened and flattened when the processing time is 100 min or shorter, the augmented temperature T is in the range of 15° C. to 70° C. (processing temperature is in the range of 295° C. to 350° C.) and the following inequality: $T \leqq -(M/3)+80$ (straight line L2 in FIG. 6(B)) is satisfied. The same experiments were conducted for sample nozzle plates provided with a water-repellent film 2 of a PTFE resin having a softening point of 327° C. The results were entirely the same as those shown in FIGS. 6(A) and 6(B), and hence the illustration of the results is omitted.

Thus, it was found through the experiments that preferable conditions for the heat treatment meet the inequalities: $15 \leqq T \leqq 70$ (°C.), $5 \leqq M \leqq 100$ (min) and $-2M+40 \leqq T \leqq -(M/3)+80$.

Nozzle plates 3 fabricated by the nozzle plate fabricating method of the present invention and heat-treated under processing conditions meeting the foregoing conditions were subjected to ink jetting experiments. All the nozzle plates did not rupture the meniscus of the ink and were able to jet the ink in the same direction.

As is apparent from the foregoing description, the nozzle plate fabricating method embodying the present invention heat-treats the nozzle plate 3 provided with the water-repellent film 2 for a given processing time at a processing time higher than the softening point of the material forming the water-repellent film 2 by the augmented temperature T after forming the nozzle hole with the excimer laser beam 11 to soften and substantially flatten the burrs of the water-repellent film 2 formed in the nozzle hole forming process. Accordingly, the nozzle plate 3 is free from burrs, and the ink-jet print head provided with the nozzle plate 3 is able to jet ink droplets in the desired direction for printing with a satisfactory print quality.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of fabricating a nozzle plate having a base plate formed of polyimide resin comprising the steps of:

forming a water-repellent film on the base plate;

forming a nozzle hole through the base plate and the water-repellent film causing burrs in the water-repellent film to form around the nozzle hole; and heat-treating the water-repellent film for a given processing time at a processing temperature higher than a softening temperature of the water-repellent film by a given augmented temperature, wherein heat-treating the water-repellent film occurs according to the following inequalities:

$$15^\circ\ \text{C.} \leqq T \leqq 70^\circ\ \text{C.}$$

$$5\ \text{min} \leqq M \leqq 20\ \text{min},$$

and $$-2M+40 \leqq T,$$

where T is the augmented temperature and M is the processing time.

2. The nozzle plate fabricating method according to claim 1 wherein the step of forming the water-repellant film includes forming the film of a thermoplastic, water-repellent material.

3. The nozzle plate fabricating method according to claim 1, wherein forming the water-repellent film includes selecting a fluororesin.

4. The nozzle plate fabricating method according to claim 3, wherein selecting the fluororesin includes selecting a hexafluoropropylene tetrafluoroethylene copolymer.

5. The nozzle plate fabricating method according to claim 1, wherein selecting the water-repellent film includes selecting a silicone resin.

6. The nozzle plate fabricating method according to claim 1, wherein heat treatment occurs at a processing temperature that is less than or equal to a melting point of the base plate.

7. The nozzle plate fabricating method according to claim 1, wherein forming the nozzle hole includes using an excimer laser.

8. A method of fabricating a nozzle plate including a base plate formed of polyimide resin comprising the steps of:

forming a water-repellent film of a thermoplastic, water-repellent material having a softening temperature lower than a softening temperature of the base plate on the base plate;

forming a nozzle hole through the base plate and the water-repellent film; and heating the water-repellent film for a given processing time at a processing temperature higher than a softening temperature of the thermoplastic, water-repellent material by a given augmented temperature to soften and substantially flatten burrs of the water-repellent film formed in the nozzle hole forming process, wherein conditions for heating the water-repellent film meet the following inequalities: 15° C.≦T≦70° C. and 5 min≦M≦20 min, where T is the given augmented temperature and M is the given processing time.

9. The nozzle plate fabricating method according to claim 8, wherein conditions for heating the water-repellent film meet the following inequality:

$$-2M+40 \leqq T$$

where T is the given augmented temperature in °C. and M is the given processing time in minutes.

10. The nozzle plate fabricating method according to claim 8, further comprising forming the base plate of a material having a melting point not lower than the processing temperature or a material resistant to thermosoftening.

11. The nozzle plate fabricating method according to claim 8, wherein forming the nozzle hole includes using an excimer laser.

12. A method of fabricating a nozzle plate including a base plate, the method comprising the steps of:

providing a base plate formed of polyimide resin;

forming a water-repellant film on at least one surface of the base plate;

forming a nozzle through the base plate and water-repellant film; and heat treating the base plate and water-repellant film after the nozzle is formed at a temperature 15° C. to 70° C. higher than a softening point of the water-repellant film for a processing time M wherein 5 min.≦M≦20 min. to soften and substantially flatten any burrs in the water-repellant film surrounding the nozzle.

13. The method of claim 12 wherein the base plate has a first softening temperature and the water-repellant film has a second softening temperature lower than the first softening temperature, and the heat treating occurs at a temperature higher than the second softening temperature.

14. The method of claim 13 wherein the step of providing the base plate having a water-repellant film includes selecting a film made of a fluororesin.

15. The method of claim 13, wherein the step of providing the base plate having a water-repellant film includes selecting a film made of a fluororesin selected from the group consisting of hexafluoropropylene tetrafluoroethylene copolymer resin (FEP resin), polytetrafluoroethylene resins (PTFE resins), perfluoroalkoxyethylene tetrafluoroethylene copolymers (PFA resins), polychlorotrifluoroethylene resins (PCTFE resins), ethylene tetrafluoroethylene copolymers (ETFE resins), polyvinylidene fluoride resins and polyvinyl fluoride resins.

16. The method of claim 13 wherein the step of forming the nozzle includes using an excimer laser beam.

17. The method of claim 12 wherein the step of heat treating the base plate and the water-repellant film includes heating at the temperature T for the time period M as defined by the following relationship:

$$-2M+40 \leqq T.$$

* * * * *